US011474657B2

United States Patent
Liao et al.

(10) Patent No.: US 11,474,657 B2
(45) Date of Patent: Oct. 18, 2022

(54) SCREEN CASTING METHOD, APPARATUS, TERMINAL AND STORAGE MEDIUM

(71) Applicant: Beijing Xiaomi Mobile Software Co., Ltd., Beijing (CN)

(72) Inventors: Yijing Liao, Beijing (CN); Kaipeng Fu, Beijing (CN); Jianjiang Qu, Beijing (CN); Ming Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/696,194

(22) Filed: Nov. 26, 2019

(65) Prior Publication Data

US 2021/0064191 A1    Mar. 4, 2021

(30) Foreign Application Priority Data

Aug. 28, 2019 (CN) .......................... 201910803914.4

(51) Int. Cl.

| G06F 3/048 | (2013.01) |
|---|---|
| G06F 3/0481 | (2022.01) |
| G06F 3/04845 | (2022.01) |
| G06F 3/14 | (2006.01) |

(52) U.S. Cl.
CPC ........ *G06F 3/0481* (2013.01); *G06F 3/04845* (2013.01); *G06F 3/1454* (2013.01)

(58) Field of Classification Search
None
See application file for complete search history.

(56) References Cited

U.S. PATENT DOCUMENTS

| 7,197,715 B1* | 3/2007 | Valeria | H04N 21/4349 |
| | | | 715/765 |
| 10,551,995 B1* | 2/2020 | Ho | G06F 3/04817 |
| 2003/0229900 A1* | 12/2003 | Reisman | H04N 21/6193 |
| | | | 348/E7.071 |
| 2007/0239335 A1* | 10/2007 | Tanaka | G06F 16/957 |
| | | | 725/38 |

(Continued)

FOREIGN PATENT DOCUMENTS

| CN | 104978156 A | 10/2015 |
| CN | 105549819 A | 5/2016 |

(Continued)

OTHER PUBLICATIONS

Jake Peterson, "YouTube 101: How to Cast Videos to Your TV Smartphones: Gadget Hacks" XP055707514, Nov. 7, 2017, https://smartphones.gadgethacks.com/ho w-to/youtube-101-cast-videos-your-tv-01786 53/.

(Continued)

*Primary Examiner* — Hua Lu
(74) *Attorney, Agent, or Firm* — Finnegan, Henderson, Farabow, Garrett & Dunner, L.L.P.

(57) ABSTRACT

A screen casting method, applied to a terminal, includes: displaying a user interface of a first application; when a screen casting instruction with respect to the first application is received, casting the user interface of the first application on a screen of another terminal for display; and displaying a homepage user interface, and shrinking the user interface of the first application and displaying the shrunk user interface of the first application through a floating window.

11 Claims, 5 Drawing Sheets

(56) References Cited

U.S. PATENT DOCUMENTS

| | | | |
|---|---|---|---|
| 2007/0250788 A1* | 10/2007 | Rigolet | G06F 3/0481 715/788 |
| 2012/0173622 A1* | 7/2012 | Toledano | H04L 65/1089 709/204 |
| 2014/0089802 A1* | 3/2014 | Wang | H04N 21/4825 715/719 |
| 2014/0195675 A1* | 7/2014 | Silver | H04L 67/02 709/224 |
| 2014/0223490 A1* | 8/2014 | Pan | G06F 3/03547 345/173 |
| 2014/0351761 A1* | 11/2014 | Bae | G06F 3/017 715/835 |
| 2015/0113432 A1* | 4/2015 | Jung | G06F 3/1454 715/748 |
| 2015/0185980 A1* | 7/2015 | An | H04M 1/72403 715/803 |
| 2015/0187041 A1* | 7/2015 | Fear | G09G 5/363 29/854 |
| 2015/0363066 A1* | 12/2015 | Lemay | G06F 3/04886 345/173 |
| 2016/0100196 A1* | 4/2016 | Wu | H04N 19/119 375/240.02 |
| 2017/0064353 A1* | 3/2017 | Kim | H04N 21/854 |
| 2017/0150203 A1* | 5/2017 | Li | G06F 3/0488 |
| 2017/0195613 A1* | 7/2017 | Yang | H04N 5/268 |
| 2017/0213389 A1* | 7/2017 | Han | G09G 5/377 |
| 2017/0235435 A1* | 8/2017 | Sohn | G06F 3/0481 715/738 |
| 2017/0249971 A1* | 8/2017 | Chong | G11B 27/34 |
| 2017/0344192 A1* | 11/2017 | Liu | H04N 21/4316 |
| 2018/0014066 A1* | 1/2018 | Berman | H04N 21/439 |
| 2018/0196596 A1* | 7/2018 | Choi | G06F 3/1431 |
| 2018/0253207 A1* | 9/2018 | Wang | H04L 67/18 |
| 2018/0275948 A1* | 9/2018 | Xu | G06F 3/1454 |
| 2018/0284948 A1 | 10/2018 | Hao et al. | |
| 2018/0329550 A1* | 11/2018 | Dellinger | G06F 3/017 |
| 2018/0341387 A1* | 11/2018 | Segal | H04L 51/04 |
| 2019/0361694 A1* | 11/2019 | Gordon | G06F 1/1626 |
| 2019/0369830 A1* | 12/2019 | Alonso Ruiz | G06F 3/0482 |
| 2020/0057596 A1* | 2/2020 | Kim | G06F 3/1454 |

FOREIGN PATENT DOCUMENTS

| | | |
|---|---|---|
| CN | 108255565 A | 7/2018 |
| CN | 108475184 A | 8/2018 |
| CN | 109165076 A | 1/2019 |
| CN | 109889885 A | 6/2019 |
| CN | 110109636 A | 8/2019 |
| KR | 10-2012-0138618 A | 12/2012 |
| KR | 10-2017-0040283 A | 4/2017 |
| KR | 20180095399 A | 8/2018 |
| RU | 2680763 C1 | 2/2019 |
| RU | 2687709 C2 | 5/2019 |
| WO | WO 2018/151522 A1 | 8/2018 |

OTHER PUBLICATIONS

Anonymous, "How to Use Picture-in-Picture (PIP) Mode in Android Oreo 8.0 and 8.1—Android Guides," XP055707524, Mar. 16, 2019, https://gadgetguideonline.com/android/how-to-use-picture-in-picture-pip-mode-in -android-oreo-8-0-and-8-1/.

European Search Report for European Application No. 20152264.6 dated Jul. 13, 2020.

International Search Report for International Application No. PCT/CN2019/110475 dated May 27, 2020.

Russian Office Action issued in Russian Application No. 2019140855/07(079790) dated Jul. 7, 2020.

English version of International Search Report from the China National Intellectual Property Administration in corresponding International Application No. PCT/CN2019/110475, dated May 27, 2020.

Notice of Allowance dated Aug. 10, 2021, from the Korean Intellectual Property Office issued in counterpart Korean Application No. 10-2019-7034606.

Notice of Reasons for Refusal dated Dec. 7, 2021, from the Japanese Patent Office issued in counterpart Japanese Application No. 2019-564795.

* cited by examiner

SCREEN CASTING METHOD, APPARATUS, TERMINAL AND STORAGE MEDIUM

CROSS-REFERENCE TO RELATED APPLICATIONS

The present application is based upon and claims priority to Chinese Patent Application No. 201910803914.4, filed on Aug. 28, 2019, the entire content of which is incorporated herein by reference.

TECHNICAL FIELD

The present disclosure relates to the field of screen casting technologies, and in particular, to a screen casting method, apparatus, terminal, and storage medium.

BACKGROUND

The screen casting technology may refer to the real-time synchronization of contents on a device (such as a mobile phone) to another large-screen device (such as a television).

When casting a screen, a user sometimes needs to perform other operations on the device that performs the screen casting. In the related art, during the screen casting, the application being cast is in a state of running in the foreground, and thus the user may not operate other functions on the device.

SUMMARY

Embodiments of the present disclosure provide a screen casting method, apparatus, terminal, and storage medium, which can be used to solve the problem that when the application being cast runs in the foreground during the screen casting, the user cannot operate other functions on the device.

According to an aspect of the present disclosure, there is provided a screen casting method, applied to a terminal, the method including: displaying a user interface of a first application; when a screen casting instruction with respect to the first application is received, casting the user interface of the first application on a screen of another terminal for display; and displaying a homepage user interface, and shrinking the user interface of the first application and displaying the shrunk user interface of the first application through a floating window.

According to an aspect of the present disclosure, there is provided a terminal, including: a processor; and a memory storing at least one instruction for execution by the processor, wherein the processor is configured to: display a user interface of a first application; when a screen casting instruction with respect to the first application is received, cast the user interface of the first application on a screen of another terminal for display; and display a homepage user interface, and shrink the user interface of the first application and display the shrunk user interface of the first application through a floating window.

According to an aspect of the present disclosure, there is provided a non-transitory computer-readable storage medium storing at least one instruction that, when executed by a processor of a terminal, causes the terminal to perform a screen casting method, the method including: displaying a user interface of a first application; when a screen casting instruction with respect to the first application is received, casting the user interface of the first application on a screen of another terminal for display; and displaying a homepage user interface, and shrinking the user interface of the first application and displaying the shrunk user interface of the first application through a floating window.

The technical solutions provided by the embodiments of the present disclosure include at least the following beneficial effects.

By generating a floating window of the first application in the terminal, and casting the user interface of the first application to the screen of another terminal by using the screen casting technology, the first application returns back to the background of the terminal, and a second application may run in the homepage user interface, so as to satisfy the user need of running multiple applications at the same time. By using this method, the problem that other operations cannot be performed when casting the screen can be solved.

DETAILED DESCRIPTION

Embodiments of the present disclosure will be further described in detail below with reference to the accompanying drawings.

Figure 1:
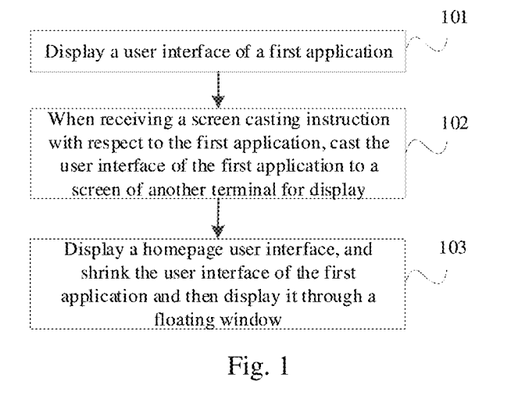
FIG. 1 is a flow chart of a screen casting method according to an exemplary embodiment.

FIG. 1 shows a flow chart of a screen casting method according to an exemplary embodiment. The method is applied to a terminal, and may include the following steps.

In step 101, a user interface of a first application is displayed.

In an embodiment, the first application is an application running in the foreground of the terminal and displayed in full screen. The first application may be any application installed in the terminal, and the user performs a screen casting operation on the first application.

In step 102, when receiving a screen casting instruction with respect to the first application, the user interface of the first application is cast to be displayed on a screen of another terminal.

Figure 2A:
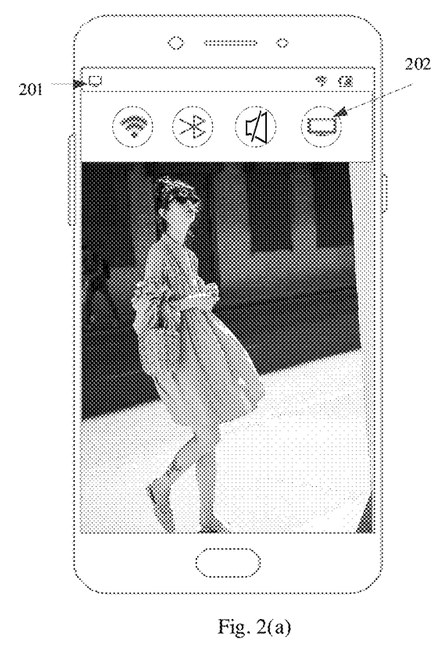
FIGS. 2(a) and 2(b) are schematic diagrams of a terminal receiving a screen casting instruction according to exemplary embodiments.
Figure 2B:
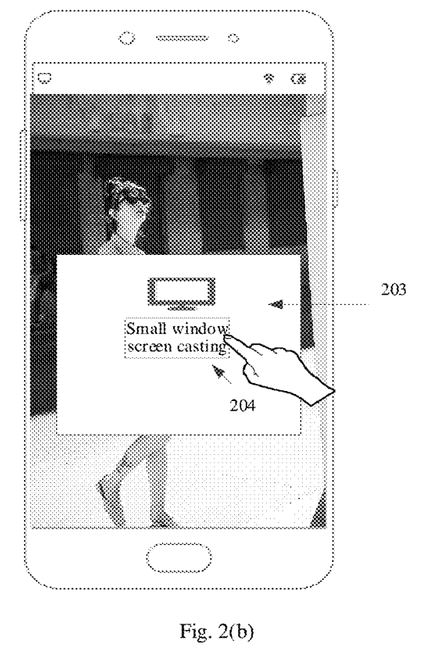

FIGS. 2(a) and 2(b) are schematic diagrams of a terminal receiving a screen casting instruction according to exemplary embodiments. In an embodiment, shown in FIG. 2(a), a first screen casting control 201 is displayed in a status bar, and the screen casting instruction for the first application is triggered by the first screen casting control 201; or a second screen casting control 202 is displayed in a notification bar, and the screen casting instruction for the first application is triggered by the second screen casting control 202. In an embodiment, shown in FIG. 2(*b*), a floating control window 203 is displayed, and a small window screen casting control 204 is displayed on the floating control window 203, then the screen casting instruction for the first application is triggered by the small window screen casting control 204.

In an embodiment, after successfully casting the first application by using the screen casting instruction, the user operates the screen casting control again, and triggers to terminate the screen casting instruction, so as to stop casting the user interface of the first application to the screen of other terminal for display.

For example, as shown in FIG. 2(*b*), the terminal displays the floating control window 203. Another terminal that has established a communication connection with this terminal is displayed in the floating control window 203, and the other terminal receives the screen casting data from this terminal, and displays the user interface of the first application being cast. The screen casting data includes at least one of symbol data, text data, digital data, voice data, image data, and video data.

In an embodiment, the triggering of the screen casting instruction includes at least one of a click operation, a double-click operation, a pressing operation, and a long-press operation on the screen casting control, which is not limited by the embodiments of the present disclosure.

In an embodiment, when the screen casting operation is received on a homepage user interface, the screen casting function is not enabled.

Referring back to FIG. 1, in step 103, a homepage user interface is displayed, and the user interface of the first application is shrunk to a smaller size and then is displayed through a floating window.

In an embodiment, the floating window is displayed by default in the middle of the right part of the homepage user interface.

In the above embodiments, the method generates a floating window for the first application in the terminal, and casts the user interface of the first application to the screen of the other terminal by using a screen casting technology, so that the first application runs in the background of the terminal, and the second application may also be run on the homepage user interface, which satisfies the user requirement for running multiple applications at the same time.

Figure 3:
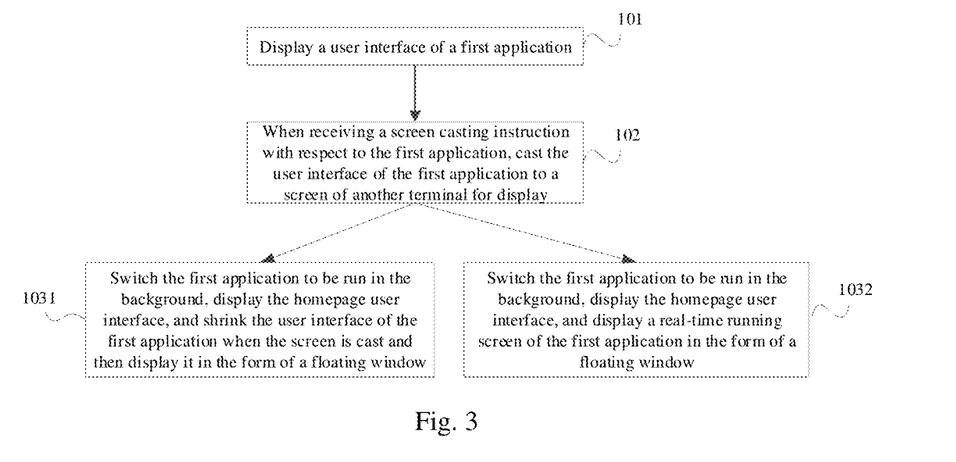
FIG. 3 is a flow chart of a screen casting method according to an exemplary embodiment.

Referring to FIG. 3, the step 103 in FIG. 1 may alternatively be implemented as step 1031 or step 1032.

In step 1031, the first application is switched to run in the background, the homepage user interface is displayed, and the user interface of the first application when the screen is cast is shrunk and then is displayed in the form of a floating window.

In step 1032, the first application is switched to be run in the background, the homepage user interface is displayed, and a real-time running screen of the first application is displayed in the form of a floating window.

It should be noted that the screen content of the floating window is not necessarily the same as the screen content displayed on the other terminal due to the screen casting. When the user interface of the first application during screen casting is zoomed out and displayed in the form of a floating window, the screen content of the floating window is the same as the screen content displayed on the other terminal due to the screen casting; and when the real-time running screen of the first application is displayed in the form of a floating window, the screen content of the floating window may be different from the screen content displayed on the other terminal due to the screen casting.

In one example, switching the first application to run in the background includes: switching an application process of the first application to the background, and keeping a process state of the application process in a running state.

It should be noted that, when the first application is switched to run in the background, the first application that is in the screen casting state may be viewed in a multitasking management interface.

In an embodiment, the terminal is based on the Android operating system, and the user may trigger the multitasking management interface by clicking a menu key of the terminal. In the multitasking management interface, all the applications running on the terminal are displayed, including the first application that is in the screen casting state. The user may swipe a finger to view all the running applications.

A clearing operation of the first application in the multitasking management interface includes: selecting the first application to be slid to an edge of the multitasking management interface; or, clicking a clear control at a lower part of the multitasking management interface.

When the first application is selected to be slid to the edge of the multitasking management interface, since the first application is locked, the first application is not cleared, the multitasking management interface does not change, and the terminal continues to cast the user interface of the first application.

When the clear control at the lower part of the multitasking management interface is clicked, since the first application is locked, the first application is not cleared, and the terminal continues to cast the user interface of the first application to the screen of the other terminal. Other locked applications in the multitasking management interface will not be cleared, and only those applications that are not locked will be cleared and eliminated from the multitasking management interface.

In an embodiment, when the clearing operation of the first application in the multitasking management interface is received, the first application is eliminated from the multitasking management interface by manual unlocking, and the user interface of the first application continues to be cast onto the screen of the other terminal.

In an embodiment, the terminal uses the Android operating system.

Activity is an application component of the Android system. One application usually consists of multiple Activities, and generally, a certain Activity in the application is specified as the main activity, that is, the Activity that is presented to the user when the application is first launched. Each Activity may obtain a View for drawing its user interface. The View window may fill the entire screen or may be smaller than the screen and float on top of other windows. SurfaceView is a base class of View. A Surface dedicated to drawing is embedded in the View. SurfaceView controls the drawing position of this Surface.

For some game, audio and video playback applications, their interfaces are complex, need to be refreshed frequently, and require efficient drawing, and generally SurfaceView is used. If View is used, the interface is drawn in the main thread of the application program and may not respond to the user input in a timely manner. SurfaceView uses a double-buffer mechanism to generate a separate drawing surface for Views that require complex and efficient interfaces, and use a separate thread to draw the interfaces for those Views. In general, on one hand, SurfaceView can implement a complex and efficient interface, and on the other hand, Surface-View can respond to the user input in time.

In an embodiment, a first identifier is set for the first application for screen casting. If the application program is an application program adopting View, the application program carries one first identifier; and if the application program is an application program adopting SurfaceView, the application program carries two first identifiers because there are two drawing surfaces. When the screen casting operation is triggered on the first application, the first identifier is set to 1, and when the screen casting end operation is triggered for the first application, the first identifier is set to 0.

SurfaceFlinger provides services for drawing interface for the application program in the Android system, and is a system service. In the SurfaceFlinger, the set first identifier is used to enable the screen casting operation for the first application or disable the screen casting operation for the first application.

In the above embodiments, the method generates a floating window for the first application during the screen casting, and switches the first application to the background to be in a running state, which solves the problem that the application will be suspended when switching the application during screen casting to the background.

Figure 4:
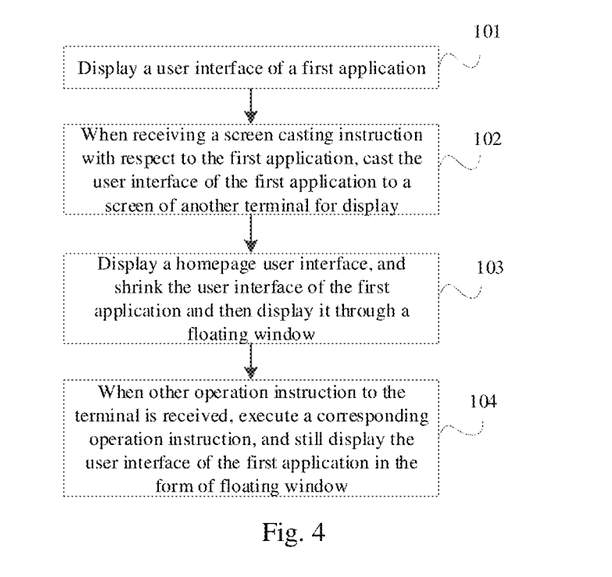
FIG. 4 is a flow chart of a screen casting method according to an exemplary embodiment.

Referring to FIG. 4, the method may include step 104 after the step 103 in FIG. 1.

In step 104, when another operation instruction to the terminal is received, the corresponding operation instruction is executed, and the user interface of the first application is still displayed in the form of floating window.

In an embodiment, the terminal receives a triggering operation instruction for an application portal of a second application.

The second application is any application other than the first application installed in the terminal. At this time, the second application runs in the foreground of the terminal, the user interface of the second application is displayed on the whole screen of the terminal, and the floating window is superimposed on the user interface of the second application.

In an embodiment, the application portal of the second application includes: an application enabling control located on the notification bar, an application enabling control located on the status bar, an application icon located on the homepage user interface.

In an embodiment, the triggering operation includes at least one of a click operation, a double-click operation, a pressing operation, and a long-press operation of the application portal of the second application, which is not limited by the embodiments of the present disclosure.

Figure 5:
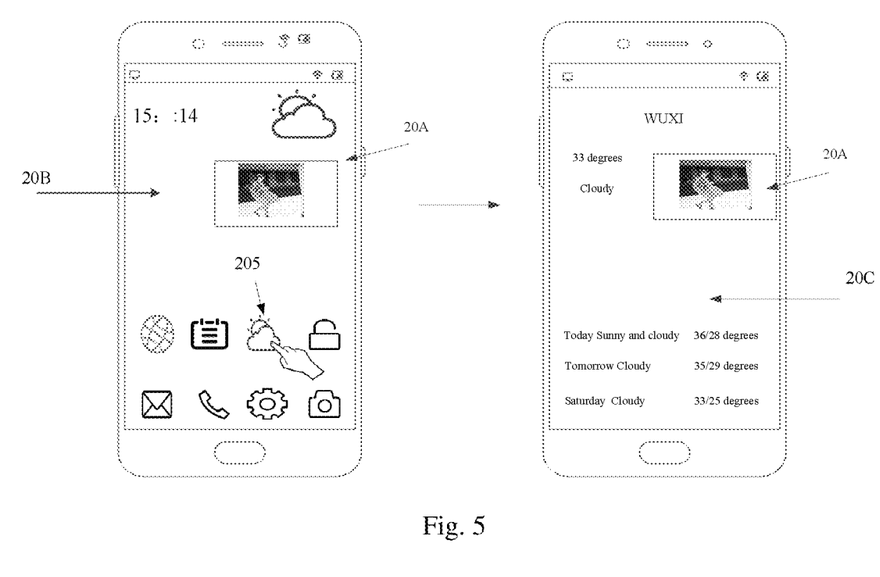
FIG. 5 is schematic diagrams of a terminal receiving another operation instruction according to an exemplary embodiment.

For example, as shown in FIG. 5, the terminal displays a homepage user interface 20B superimposed with a floating window 20A. When receiving a triggering operation on an application portal 205 of a second application, the homepage user interface 20B is switched to the user interface 20C of the second application. At this time, the second application runs in the foreground of the terminal, and the floating window 20A is superimposed on the user interface 20C of the second application.

In the above embodiment, the method generates a floating window for the first application being screen cast, makes the first application to be switched to the background and in a running state, and the user may perform other operations on the terminal and run other application in the foreground of the terminal, which satisfies the needs of users for running other application during screen casting.

Figure 6:
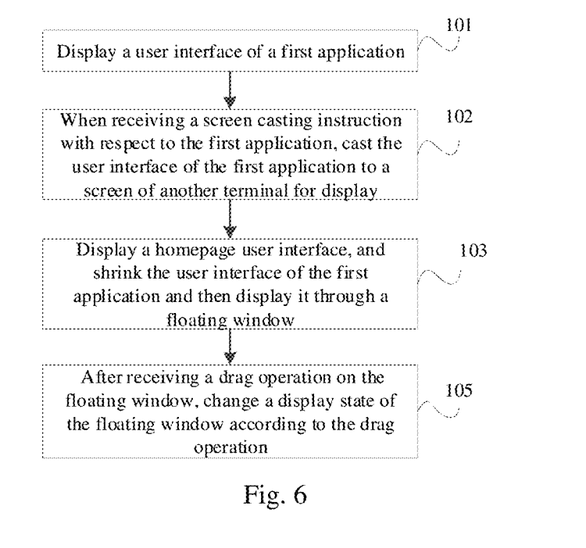
FIG. 6 is a flow chart of a screen casting method according to an exemplary embodiment.

FIG. 6 shows a flow chart of a screen casting method according to an exemplary embodiment. On the basis of FIG. 1, the method may include step 104 after the step 103.

In step 105, after receiving a drag operation on the floating window, a display state of the floating window is changed according to the drag operation.

In an embodiment, the drag operation only changes the display state of the floating window, and does not affect the terminal to cast the user interface of the first application to the screen of the other terminal.

For example, the drag operation includes at least one of moving the floating window upward, moving the floating window downward, moving the floating window to the left, or moving the floating window to the right.

After the drag operation, when the distance between the floating window and the edge of the screen is less than a threshold value, the floating window is shrunk to an edge for display; where this edge is an edge other than the edge where the status bar and the navigation bar are located.

In an embodiment, the threshold value is set by the terminal, and the distance between the floating window and the edge of the screen is defined as a length from the center of the floating window to the edge of the screen.

It should be noted that, at this time, the screen may be displayed as a homepage user interface, or may be displayed as a second user interface.

In an embodiment, after receiving an expanding operation on the shrunk floating window, the floating window is restored from the edge to the non-edge area.

In an embodiment, the expanding operation includes: clicking on the shrunk floating window; or sliding the shrunk floating window to the non-edge area of the screen.

In an embodiment, after receiving a retraction operation on the expanded floating window, the floating window is displayed from the non-edge area to the edge.

For example, when the floating window is slid toward the edge of the screen, the floating window is retracted.

In an embodiment, when another floating control is included between the floating window and the edge, after moving the floating window to the target position, the floating window is shrunk to the edge for display; where the target position is a position with the edge where no other floating control is included.

In an embodiment, the floating control includes: a floating ball, a game toolbox, and an acceleration ball.

Figure 7:
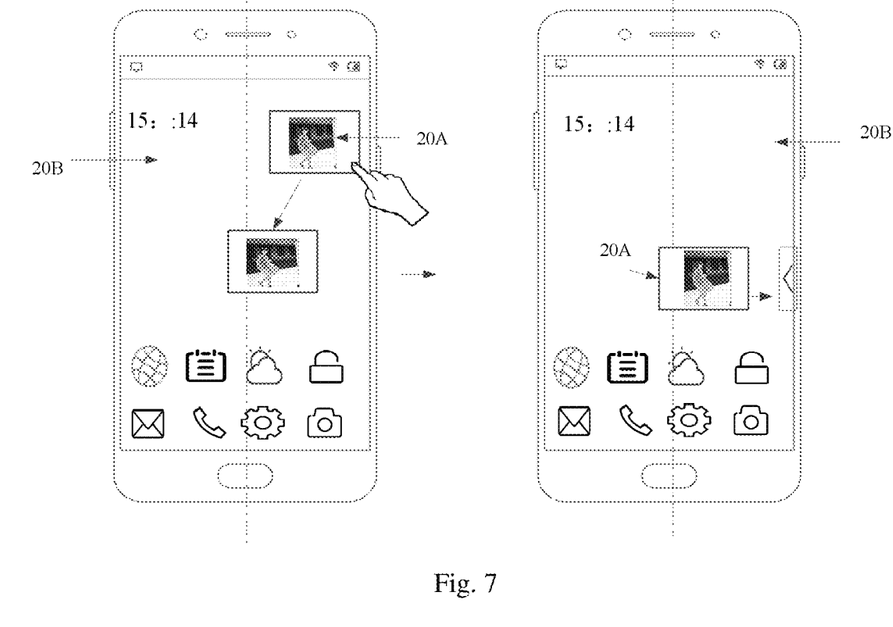
FIG. 7 is schematic diagrams of a terminal receiving a drag operation according to an exemplary embodiment.

For example, as shown in FIG. 7, the floating window 20A is superimposed and displayed on the upper right position of the homepage user interface 20B. By the drag operation, the display position of the floating window 20A is changed to the center of the homepage user interface 20B.

The threshold value is set to be half of a width of the home user interface 20B. At this time, the terminal calculates the distances between the floating window 20A and the left and right edges of the home user interface 20B. The distance to the right edge of the home user interface 20B is less than the set threshold, and the floating window 20A is shrunk to the right edge of the home user interface 20B.

In the above embodiments, the method can change the position of the floating window by the drag operation, and change the size of the floating window by expanding or retracting, thereby reducing hindering on other operations of the user due to the floating window, and facilitating the user's use of the application that requires full screen, such as operating a game or playing a video.

Figure 8:
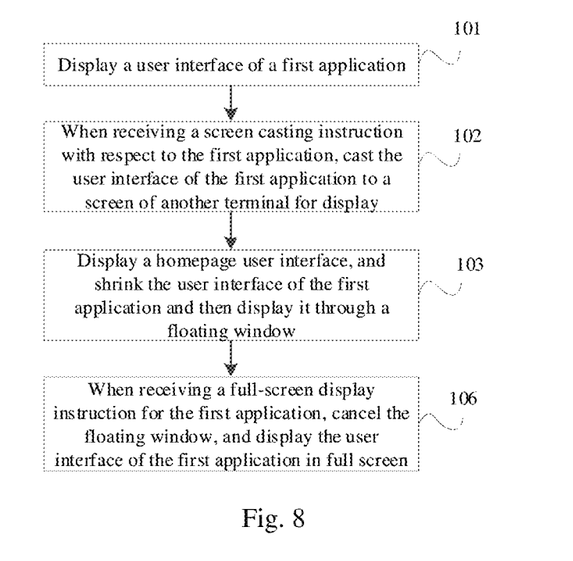
FIG. 8 is a flow chart of a screen casting method according to an exemplary embodiment.

FIG. 8 shows a flow chart of a screen casting method according to an exemplary embodiment. On the basis of FIG. 1, the method may include step 106 after the step 103.

In step 106, when receiving a full screen display instruction for the first application, the floating window is cancelled, and the user interface of the first application is displayed in full screen.

In an embodiment, the full screen display instruction for the first application is triggered by at least one of the following methods.

In a first method, when receiving a triggering operation on the floating window, the user interface of the first application is displayed in full screen.

For example, when the user interface of the first application is cast on the screen of the other terminal by the terminal, a floating window is superposed on the homepage user interface. When the user triggers the floating window, the display interface of the terminal is changed from the homepage user interface to the user interface of the first application, and the first application changes from the background running state to the foreground running state.

In a second method, when receiving a triggering operation on the first application in the multitasking management interface, the user interface of the first application is displayed in full screen.

For example, all running applications are displayed in the multitasking management interface. When the user triggers the first application in the multitasking management interface, the display interface of the terminal is changed from the multitasking management interface to the user interface of the first application, and the first application changes from the background running state to the foreground running state.

In a third method, when receiving a triggering operation on the first application in the notification bar, the user interface of the first application is displayed in full screen.

In an embodiment, the user may enable the notification bar by sliding from top to bottom at the top of the screen of the terminal. The notification bar may be managed through system settings, allowing the first application to be displayed in the notification bar.

When receiving a triggering operation on an icon of the first application in the homepage user interface, the user interface of the first application is displayed in full screen.

For example, when the user triggers the first application in the homepage user interface, the display interface of the terminal is changed from the homepage user interface to the user interface of the first application, and the first application changes from the background running state to the foreground running state.

In an embodiment, the triggering operations include at least one of a click operation, a double-click operation, a pressing operation, and a long-press operation, which is not limited by the embodiments of the present disclosure.

In the above embodiments, the method restores the display of the user interface of the first application in full screen by the triggering operation, and at the same time, the floating window is cancelled, and the use of the first application in the terminal is not affected.

Figure 9:
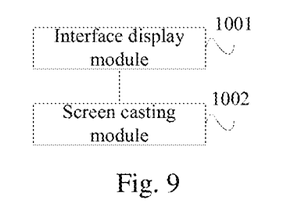
FIG. 9 is a block diagram of a screen casting apparatus according to an exemplary embodiment.

FIG. 9 is a block diagram of a screen casting apparatus according to an exemplary embodiment, which may be implemented as all or part of a terminal by software, hardware, or a combination of both. The apparatus includes an interface display module 1001 and a screen casting module 1002.

The interface display module 1001 is configured to display a user interface of the first application.

The screen casting module 1002 is configured to, when receiving a screen casting instruction with respect to the first application, cast the user interface of the first application to the screen of the other terminal.

The interface display module 1001 is configured to display a homepage user interface, shrink the user interface of the first application and display the shrunk user interface through a floating window.

The apparatus in this embodiment generates a floating window for the first application in the terminal, and uses the screen casting technology to cast the user interface of the first application to the screen of the other terminal, so that the first application runs in the background of the terminal, the second application may also be run on the homepage user interface, which satisfies the requirement of the user for running multiple applications at the same time.

Figure 10:
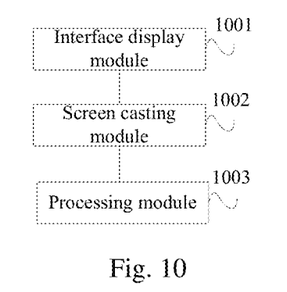
FIG. 10 is a block diagram of a screen casting apparatus according to an exemplary embodiment.

FIG. 10 is a block diagram of a screen casting apparatus according to an exemplary embodiment, which may be implemented as all or part of a terminal by software, hardware, or a combination of both. The apparatus includes an interface display module 1001, a screen casting module 1002, and a processing module 1003.

The interface display module 1001 is configured to display a user interface of the first application.

The screen casting module 1002 is configured to, when receiving the screen casting instruction with respect to the first application, cast the user interface of the first application to the screen of the other terminal.

The interface display module 1001 is configured to display a homepage user interface, shrink the user interface of the first application and display it through a floating window.

In an embodiment, the processing module 1003 is configured to switch the first application to run in the background, and the interface display module 1001 is configured to display the homepage user interface, shrink the user interface of the first application when screen casting and then display it by the floating window.

In an embodiment, the processing module 1003 is configured to switch the first application to run in the background, and the interface display module 1001 is configured to display the homepage user interface, and display the real-time running screen of the first application in the form of the floating window.

In an embodiment, the processing module 1003 is configured to, when receiving another operational instruction to the terminal, execute a corresponding operational instruction.

The interface display module 1001 is configured to still display the user interface of the first application in the form of the floating window.

In an embodiment, the processing module 1003 is configured to display a first screen casting control in the status bar, and trigger the screen casting instruction on the first application by using the first screen casting control.

The processing module 1003 is configured to display a second screen casting control in the notification bar, and trigger the screen casting instruction on the first application by using the second screen casting control.

The processing module 1003 is configured to display a floating control window, a small window screen casting control being displayed on the floating control window, and trigger the screen casting instruction for the first application by using the small window screen casting control.

In an embodiment, the interface display module 1001 is configured to, after receiving a drag operation on the floating window, change a display state of the floating window according to the drag operation.

In an embodiment, the interface display module 1001 is configured to, when receiving a full screen display instruction for the first application, cancel the floating window, and display the user interface of the first application in full screen.

Figure 11:
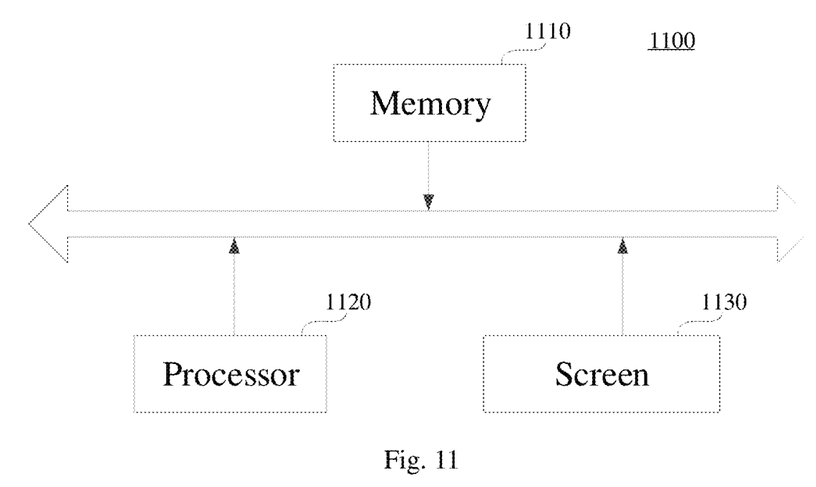
FIG. 11 is a block diagram of a terminal according to an exemplary embodiment.

FIG. 11 is a block diagram of a terminal 1100 according to an exemplary embodiment. The terminal 1100 may be an electronic device that installs and runs an application and can perform screen casting, such as a smartphone, a tablet, an e-book, a portable personal computer, or the like. The terminal 1100 may include one or more of the following components: a processor 1110, a memory 1120, and a screen 1130.

The processor 1110 may include one or more processing cores. The processor 1110 connects various portions within the entire terminal 1100 using various interfaces and lines, and executes various functions and processes data in the terminal 1100 by running or executing an instruction, a program, a code set, or a set of instructions stored in the memory 1120, and calling data stored in the memory 1120. In an embodiment, the processor 1110 may be implemented by using at least one hardware form of a Digital Signal Processing (DSP), a Field-Programmable Gate Array (FPGA), and a Programmable Logic Array (PLA). The processor 1110 may integrate one or a combination of a Central Processing Unit (CPU), a Graphics Processing Unit (GPU), a modem, or the like. The CPU mainly processes an operating system, a user interface, an application program, and the like; the GPU is responsible for rendering and drawing content that needs to be displayed on the screen 1130; and the modem is used to process wireless communication. In some embodiments, the modem may not be integrated into the processor 1110, and is implemented by a single communication chip.

The memory 1120 may include a Random Access Memory (RAM), and may also include a Read-Only Memory. In an embodiment, the memory 1120 includes a non-transitory computer-readable storage medium. The memory 1120 may be used to store instructions, programs, code, code sets, or sets of instructions. The memory 1120 may include a storage program area and a storage data area, where the storage program area may store instructions for implementing the operating system, instructions for implementing at least one function (such as a touch function, a sound playing function, an image playing function, etc.), and instructions for implementing the foregoing method embodiments. The operating system may be an Android system (including a system deeply developed based on the Android system), an iOS system developed by Apple (including a system deeply developed based on the iOS system), or other systems. The storage data area may also store data (such as a phone book, audio and video data, chat record data) created by the terminal 1100 in use, and the like.

The screen 1130 may be a touch display screen for receiving touch operations thereon or there nearby by a user using any suitable object, such as a finger, a stylus, etc., and displaying a user interface of various application program. The touch display screen is generally disposed at the front panel of the terminal 1100. The touch display may be designed as a full screen, a curved screen or an irregular-shaped screen. The touch screen display may also be designed as a combination of a full screen and a curved screen, and a combination of the irregular-shaped screen and the curved screen, which is not limited in the embodiments of the present disclosure.

Those skilled in the art can understand that the structure of the terminal 1100 shown in the figure does not constitute a limitation on the terminal 1100, and the terminal may include more or less components than the illustration, or a combination of some components, or different components. For example, the terminal 1100 further includes components such as a radio frequency circuit, a shooting component, a sensor, an audio circuit, a Wireless Fidelity (WiFi) component, a power supply, a Bluetooth component, and the like, and details are not described herein.

The embodiments of the present disclosure also provide a computer readable medium storing at least one instruction, which is loaded and executed by the processor to implement the screen casting method as described in the above various embodiments.

The embodiments of the present disclosure also provide a computer program product storing at least one instruction, which is loaded and executed by the processor to implement the screen casting method as described in the above various embodiments.

Those skilled in the art will appreciate that in one or more examples described above, the functions described in the embodiments can be implemented in hardware, software, firmware, or any combination thereof. When implemented in software, the functions may be stored in a computer readable medium or transmitted as one or more instructions or code on a computer readable medium. The computer readable media includes a computer storage media and a communication media, and the communication media includes any medium that facilitates transfer of the computer program from one location to another. The storage medium may be any available media that may be accessed by a general purpose or special purpose computer.

The above description is only exemplary embodiments of the present disclosure, and is not intended to limit the present disclosure, and any modifications, equivalents, improvements, etc., made within the spirit and principles of the present disclosure should be included in the protection scope of the present disclosure.

What is claimed is:

1. A screen casting method, applied to a terminal, comprising:
displaying a user interface of a first application on a screen of the terminal;
when a screen casting instruction with respect to the first application is received, casting the user interface of the first application on a screen of another terminal for display; and
switching the first application to run in a background, displaying a homepage user interface, shrinking the user interface of the first application and displaying the shrunk user interface of the first application through a floating window on the screen of the terminal, and displaying a real-time running screen of the first application in the floating window,
wherein when a distance between the floating window and an edge of the screen is less than a threshold value, the floating window is shrunk to the edge for display,
wherein when a floating control is included between the floating window and the edge, the floating window is shrunk to the edge for display after being moved to a target position, wherein no floating control is included between the target position and the edge,
wherein the method further comprises setting an identifier for the first application for screen casting, wherein when a screen casting operation is triggered on the first application, the identifier is set to 1, and when a screen casting end operation is triggered for the first application, the identifier is set to 0.

2. The method according to claim 1, further comprising:
when another operation instruction with respect to the terminal is received, executing the corresponding operation instruction, and still displaying the user interface of the first application in the floating window.

3. The method according to claim 1, wherein the screen casting instruction with respect to the first application is triggered by at least one of:
displaying a first screen casting control in a status bar, and triggering the screen casting instruction with respect to the first application by the first screen casting control;
displaying a second screen casting control in a notification bar, and triggering the screen casting instruction with respect to the first application by the second screen casting control; or
displaying a floating control window, a small window screen casting control being displayed on the floating control window, and triggering the screen casting instruction with respect to the first application by the small window screen casting control.

4. The method according to claim 1, further comprising:
after receiving a drag operation on the floating window, changing a display state of the floating window according to the drag operation.

5. The method according to claim 1, further comprising:
when a full screen display instruction with respect to the first application is received, cancelling the floating window, and displaying the user interface of the first application in full screen.

6. A terminal, comprising:
a processor; and
a memory storing at least one instruction for execution by the processor,
wherein the processor is configured to:
display a user interface of a first application on a screen of the terminal;
when a screen casting instruction with respect to the first application is received, cast the user interface of the first application on a screen of another terminal for display; and
switch the first application to run in a background, display a homepage user interface, shrink the user interface of the first application and display the shrunk user interface of the first application through a floating window on the screen of the terminal, and display a real-time running screen of the first application in the floating window,
wherein when a distance between the floating window and an edge of the screen is less than a threshold value, the floating window is shrunk to the edge for display,
wherein when a floating control is included between the floating window and the edge, the floating window is shrunk to the edge for display after being moved to a target position, wherein no floating control is included between the target position and the edge,
wherein the processor is further configured to set an identifier for the first application for screen casting, wherein when a screen casting operation is triggered on the first application, the identifier is set to 1, and when a screen casting end operation is triggered for the first application, the identifier is set to 0.

7. The terminal according to claim 6, wherein the processor is further configured to:
when another operation instruction with respect to the terminal is received, execute the corresponding operation instruction, and still display the user interface of the first application in the floating window.

8. The terminal according to claim 6, wherein the screen casting instruction with respect to the first application is triggered by at least one of:
displaying a first screen casting control in a status bar, and triggering the screen casting instruction with respect to the first application by the first screen casting control;
displaying a second screen casting control in a notification bar, and triggering the screen casting instruction with respect to the first application by the second screen casting control; or
displaying a floating control window, a small window screen casting control being displayed on the floating control window, and triggering the screen casting instruction with respect to the first application by the small window screen casting control.

9. The terminal according to claim 6, wherein the processor is further configured to:
after receiving a drag operation on the floating window, change a display state of the floating window according to the drag operation.

10. The terminal according to claim 6, wherein the processor is further configured to:
when a full screen display instruction with respect to the first application is received, cancel the floating window, and display the user interface of the first application in full screen.

11. A non-transitory computer-readable storage medium storing at least one instruction that, when executed by a processor of a terminal, causes the terminal to perform a screen casting method, the method comprising:
displaying a user interface of a first application on a screen of the terminal;
when a screen casting instruction with respect to the first application is received, casting the user interface of the first application on a screen of another terminal for display; and
switching the first application to run in a background, displaying a homepage user interface, shrinking the user interface of the first application and displaying the shrunk user interface of the first application through a floating window on the screen of the terminal, and displaying a real-time running screen of the first application in the floating window,
wherein when a distance between the floating window and an edge of the screen is less than a threshold value, the floating window is shrunk to the edge for display,
wherein when a floating control is included between the floating window and the edge, the floating window is shrunk to the edge for display after being moved to a target position, wherein no floating control is included between the target position and the edge,
wherein the method further comprises setting an identifier for the first application for screen casting, wherein when a screen casting operation is triggered on the first application, the identifier is set to 1, and when a screen casting end operation is triggered for the first application, the identifier is set to 0.

* * * * *